SEQUENTIAL SWITCHING ARRANGEMENTS

Filed June 4, 1965

INVENTOR
JOHN M. LORD
GLENN E. STERLY
BY
ATTY.

SEQUENTIAL SWITCHING ARRANGEMENTS

INVENTOR
JOHN M. LORD
GLENN E. STERLY
BY
ATTY.

United States Patent Office 3,419,684

Patented Dec. 31, 1968

3,419,684

SEQUENTIAL SWITCHING ARRANGEMENTS

John M. Lord, Park Ridge, and Glenn E. Sterly, Carol Stream, Ill., assignors to Automatic Electric Laboratories, Inc., Northlake, Ill., a corporation of Delaware

Filed June 4, 1965, Ser. No. 461,426

6 Claims. (Cl. 179—99)

ABSTRACT OF THE DISCLOSURE

A two-line telephone station having a single key, which operatively controls a cam to either of two rotary positions from a normal position, the first being a line holding and transfer position and the second being a transfer only position. The station circuit includes at least two oppositely mounted cam-controlled contact sets and a holding bridge relay controlled by certain ones of these contacts.

The key cam has a long cam surface at one end and a short cam surface at the other end, so that upon rotation of the cam the two contact sets are operated in one order or the other depending on the direction of rotation of the cam. In this manner the direction of actuation of the key determines whether the holding relay is permitted to operate and lock or not. An additional function may be provided by the use of a combination push-and-turn key.

This invention relates to sequential switching arrangements, and is more particularly concerned with improvements in the facilities at two-line telephone stations for optionally placing a hold condition on the first line during transfer of the station circuit to the second line.

As an example in a telephone system, a telephone user engaged in a call over a first line may wish to use a second line, for example, in order to initiate or answer calls thereover. In this situation facilities are often required for enabling the user to optionally hold the original line, in the meantime, thereby preventing disconnect supervision, usually in the form of a prolonged opening of the line loop circuit, from being returned to the connecting equipment at the other end of the line. For instance, on manually extended calls, in the absence of such holding facilities, the attendant would not be informed about the call and would take down the connecting cords upon observing the disconnect signal. For the same reason, automatic switching equipment would restore and disconnect the transmission path it had established.

For these reasons it is important that two-line telephone sets have transfer and, in addition, optional line-holding control facilities.

Previous to the present invention, two-line telephone sets have, for this purpose, employed separate transfer and holding keys. In some cases line holding was by means of a bridging resistor, while in other cases this was accomplished with a relay winding. Contacts of the relay were used for establishing conference connections. In these cases, the circuit at the station included connections through hookswitch contacts which, upon restoration of the handset, automatically removed the line holding condition.

The principal object of this invention is therefore to provide improved station facilities for a two-line station.

Another object of this invention is to provide these facilities with arrangements wherein a single switching device controls the above-mentioned line transfer and line holding conditions at the station.

It is a further object of this invention to arrange the switching device for effecting the transfer upon being moved in either one of two opposite directions, but causing the first line to be held only if it is moved in one of the directions.

Yet another object of this invention is to hold the line by means of a relay arranged for locking, so that the line remains held under the joint control of both ends of the line.

It is a feature of this invention to provide a switching device having first and second contact spring pileups and a movable actuating member with cam means of a configuration comprising a first and a second coplanar diametrically opposed arcuately-shaped surface, such that both pileups are operated by the cam surfaces upon the movement of the member in either of two directions, and that the cam surfaces operate the spring pileups in a different order depending on whether it is moved in the one or the other direction.

In the embodiment of the switching device shown herein the actuating member comprises a shaft having a cam with a generally overall triangular cam surface oriented to engage springs of the first and second pileups in a sequence corresponding to the direction in which the shaft is rotated.

Preferably, the first spring pileup comprises first and second sets of contact springs, and the second spring pileup comprises first and second sets of contact springs, and the second pileup comprises a third set of contact springs oppositely positioned from the cam in an arrangement such that the second, first and third contact sets operate, in that order, upon engagement of the side portions of the arcuate cam surfaces adjacent to the base and apex thereof with the second and then the third sets respectively upon rotation of the shaft in the one direction, and the third, second and first sets operate, in this last-mentioned order, upon engagement of the opposite side portions of the arcuate cam surfaces adjacent the base and apex thereof with the third and then second sets respectively upon rotation of the shaft in the opposite direction.

There is also provided an auxiliary set of contact springs mounted in the pileups of the switching device, and a support fixedly mounting the pileups and also mounting the above-mentioned shaft for rotational movement, as well as axial sliding movements, so that the latter causes the shaft to engage and close the auxiliary set of spring contacts in turn.

There is provided in the switching device of the embodiment, a detent spring mounted on the support, and the shaft has an element of generally cubic cross-section and having cam faces engaged by the detent spring upon rotational as well as axial movement of the shaft.

The relationship between the detent spring and abutment portions extending from opposite side faces of the cubical element is such that rotational movement of the shaft in either direction is limited by engagement of the side faces with the respective side surfaces of the detent spring.

In the embodiment of the invention disclosed herein, the switching device referred to above is provided, in conjunction with a holding relay, at a two-line telephone station, the arrangement is such that contacts of the switching device causing connections with the station circuit to be transferred from the first to the second line are sequentially operated upon operation of the actuating element in either of the two directions, and that the holding relay is permitted to operate and lock upon movement of the element in the one direction but not in the opposite direction.

According to another feature of this invention, the line holding relay has an operating circuit including first and second control contacts which enable and disable the circuit respectively, and also a locking circuit. These circuits are brought into play only if the element is actuated in the one direction.

The relay operates by the winding being energized from the first line over a path serially including the first make and the second break control contacts and remains operated with the winding being held energized from the line by way of a line bridging path. This path includes the first control contact and a locking contact of the relay. The relay locking contact is momentarily bridged by the second control contact before the second contact operates subsequent to the line transfer, thus guarding the line against unwanted release.

Upon actuation of the above element in the opposite direction, the line holding relay is disabled by the break contact in the operating circuit operating first and remaining operated while the transfer is effected, thereby preventing the relay from operating, and also preventing the bridging path for the first line from being completed.

Other objects and features of this invention will become apparent from a perusal of the following detailed description taken in association with the illustration of a preferred embodiment of this invention, as found in the accompanying drawings.

Figure 2:
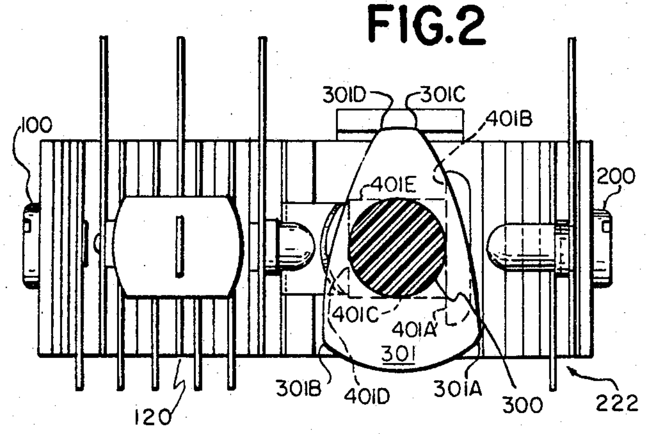
FIG. 2 is a top plan view taken along the line 2—2 of FIG. 1 showing less detail than FIG. 1, but more specifically to show how the shaft and triangular cam surfaces are oriented with respect to the spring pileups on either side, the shaft being free to be manually rotated in either direction from the unoperated position.
Figures 1, 3:
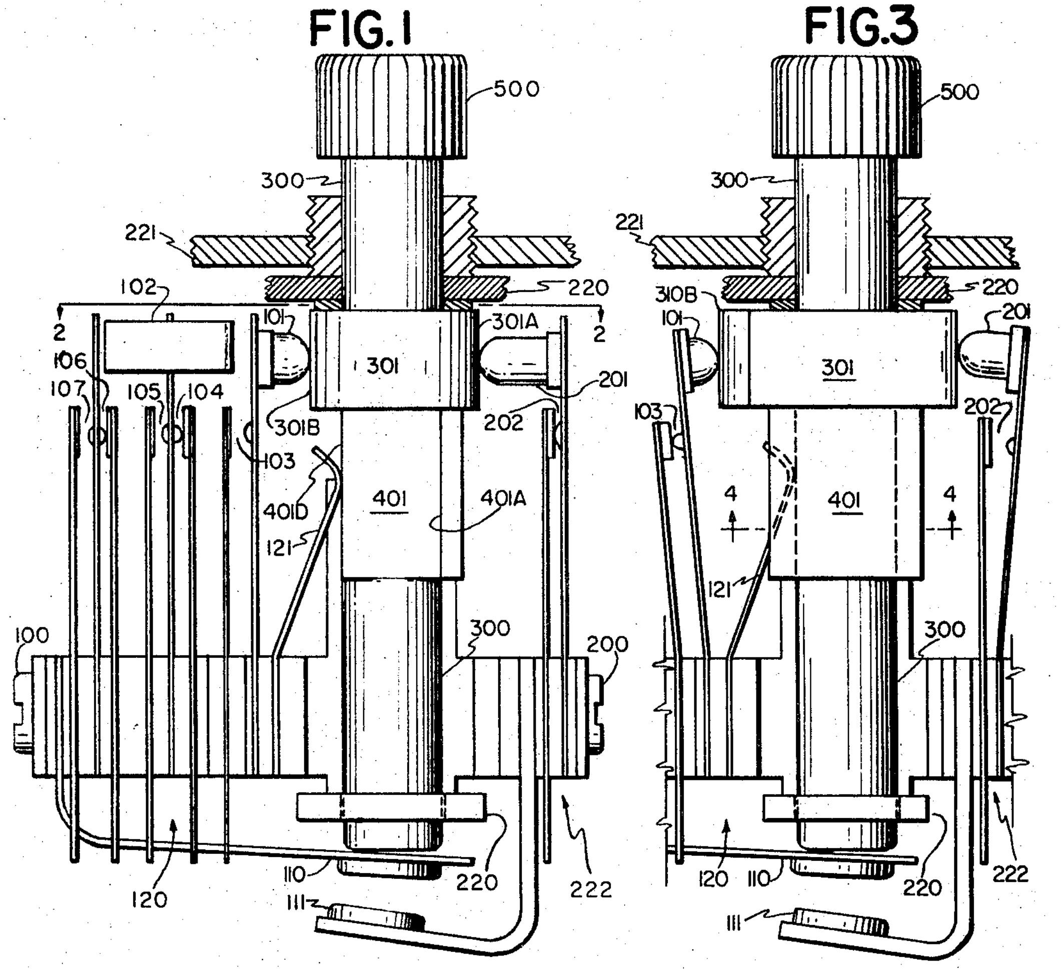
FIG. 1 is a front view illustrating an assembly of the switching device components, and also a mounting of the unit in some convenient portion of the telephone set.
FIG. 3 is a partial view showing the actuating portion of the switch when fully turned in one of the two directions of movement.
Figure 5:
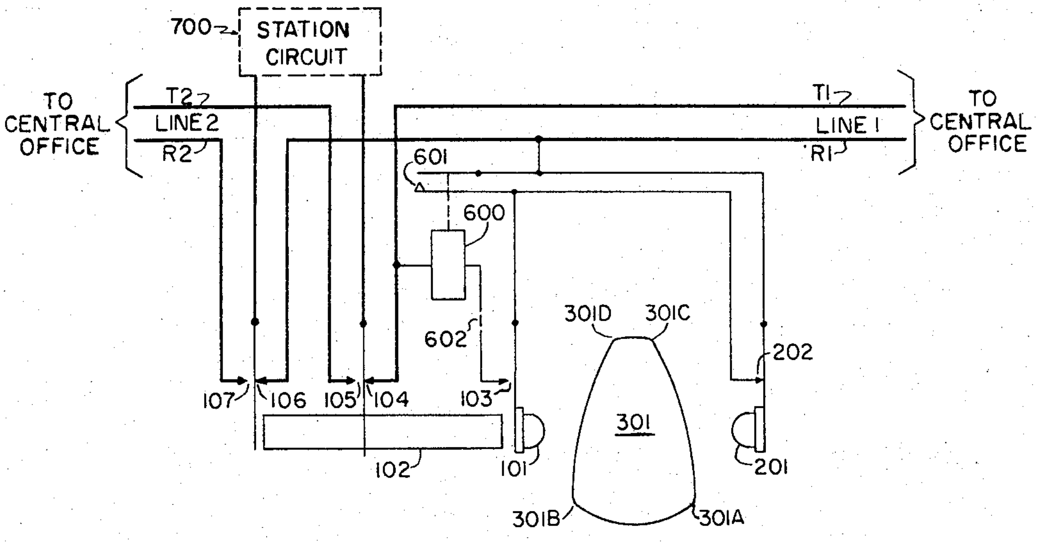

FIG. 5 schematically shows acircuit in a communication system, for example a telephone system, in which the switching device, of FIGS. 1 and 2 may be used for causing a station circuit to be transferred from a first line to a second line upon movement of the cam element in either direction, but permitting a line holding relay to operate and hold the first line over a bridging path only if the cam is moved in one of the two directions.

Figure 5A:
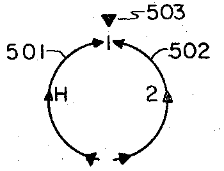

FIG. 5A indicates schematically the two opposite directions of movement of the actuating member and cam of FIG. 5 with respect to a reference point.

Figures 6, 6A:
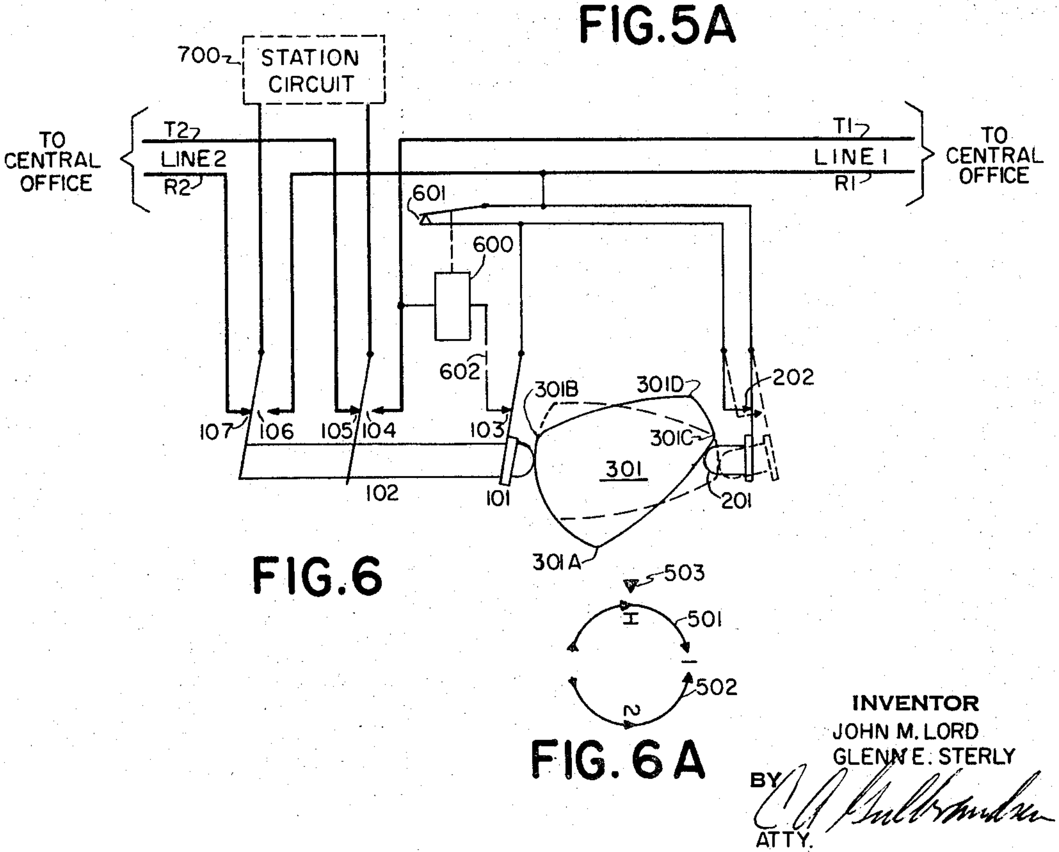

FIG. 6 is a modified schematic, similar to FIG. 5, showing the sequential engagements made by the two arcuate cam surfaces with the spring pileups while transferring the station circuit to the second line and holding the first line as the shaft is rotated in the "holding" direction.

FIG. 6A is similar to FIG. 5A except after clockwise movement of the cam shown in FIG. 6 for holding purposes.

In the embodiment of the invention described herein the switching device is in the form of a manually operated key as shown in the accompanying drawings.

It will be recognized from FIG. 1 that the key finds particular utility in a telephone station set, not shown, where it can be mounted in an opening in a portion 221 of the subset housing such that the turning knob 500 of the key is readily accessible to the telephone user. The knob can be selectively rotated in the two opposite directions, 501, or 502, as indicated by FIG. 5A, which shows the indicia H and 2 on the top face of the knob in relation to an indicator point 503, which shows the key in the normal position, as designated by the indicia 1. When the knob is fully rotated in the clockwise direction, indicia H becomes aligned with indicator point 503, as shown in FIG. 6A. It will be understood that if the knob is instead fully turned in the counterclockwise direction, indicia 2 becomes aligned with point 503. The knob is affixed to the upper end, as viewed in FIG. 1, of a shaft 300 extending inwardly from housing portion 221.

The key has a frame 220, FIG. 1, which mounts the shaft for both rotary and axial movement, that is, the key of the embodiment is a push-and-turn key. Frame 220 also mounts the spring pileup assemblies 120 and 222. The first pileup assembly 120 of spring contacts is mounted on the frame by screws 100, thereby securing to the frame a first set of break-make transfer contact springs 104, 105, 106, and 107; a second set of make contact control springs 103, and a detent spring 121; and on the opposite side of the shaft-cam arrangement is the second pileup 222 of springs consisting of break contact control springs 202 secured to the frame by screws 200. Auxiliary make contact springs 110 and 111 are mounted in the first and second pileups respectively and disposed so that spring 110 rests against the lower end of the shaft 300 with a pressure forcing the latter upward. Obviously this upward pressure can be overcome by depressing knob 500 downward, and thereby closing an auxiliary path including the springs. This auxiliary path can be a signaling path connected to equipment, not shown.

Referring now to both FIG. 1 and FIG. 2, the latter showing a top plan view of the assembly, attention is directed mainly to the triangular shaped cam 301 on shaft 300. This cam has arcuate surfaces, including engaging shoulders 301A, 301B and 301C, and 301D, which sequentially operate the above-mentioned sets of contact springs as engagement is made with bushings 101 of the first pileup and 201 of the second pileup. Note that when bushing 101 is moved it causes contact 103 to close before engaging bushing 102, which then breaks contacts 104 and 106 before contacts 105 and 107 are made, that is contacts 104, 105 and 106, 107 are "break-make" combinations. The triangular shape of cam 301 is particularly important in this arrangement, as it determines the sequence in which contact springs 103 and 202 will close or open in paths depending on the direction the key is turned. This arrangement will be more fully explained below with reference to FIGS. 5 and 6.

Figure 4:
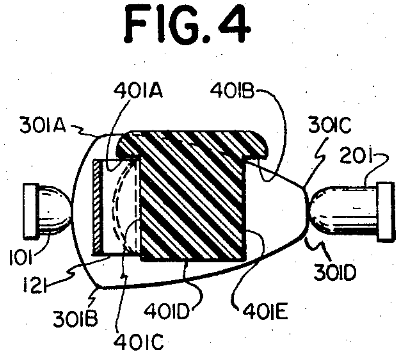
FIG. 4 is an upward view taken along the line 4—4 of FIG. 3 for showing cross-sectional relationships of the detent spring engaging a cubical section at one of three engageable faces of the section, and particularly showing how the movement of the shaft is limited by engagement of sides of the detent spring with corresponding abutments extending from the shaft on opposite sides thereof.

Continuing with the mechanical aspects of this invention, the key does not depend upon a pin element protruding from the shaft for limiting its turning movements in the usual manner, but rather in this case, the movement of the key shaft is limited by the following arrangement: As shown in FIG. 1, the above-mentioned detent spring 121 has its lower portion secured in the first spring pileup 120 while the upper spring portion is free to flex outward while bearing against the faces on cam element 401 as the shaft 300 is either depressed axially or rotated in one or the other direction. This cam element has a generally cubic cross-section and any one of the three faces 401C, 401D, and 401E of this element can be engaged consecutively by the fixed detent spring 121, during rotation of the element. This is obvious from an inspection of drawing FIG. 4, which shows the shaft and cam in the hold position of the key. It is seen that abutment surfaces 401A and 401B are the means for limiting rotational movement of the shaft as engagement is made with the respective sides of the detent spring 121.

Turning now to the circuit environment to which the switching device, according to the invention, is assumed to be applied herein. FIG. 5 shows a two-line station 700 representing any well-known central-battery type station in a communication, e.g. telephone system. It is understood that the telephone has hookswitch contacts, not shown, for closing a line loop circuit, e.g. to a central office, if the handset is removed from the cradle. For purposes of this description it is assumed that telephone connections have been established through the aforementioned hookswitch contacts, from conductors T1, R1 of line one to station circuit 700 by way of the transfer spring contacts 104 and 106 respectively. FIG. 5 also shows contact 103 of the first spring pileup and contact 202 of the second spring pileup, respectively on the left and right sides of the triangular cam 301, as viewed in the figure, in the condition before the cam has been moved in either direction to transfer the station circuit to conductors T2 and R2 of line two at contacts 105 and 107. As will also be noted from FIG. 5, there is provided a holding path for line one which includes relay 600, another hookswitch contact 602, normally open contact 103 and the parallel combination of contact 202, and relay contact 601 in series. Relay 600 is preferably of the dry reed type.

Assume now that the above-mentioned cam is turned in the clockwise direction, designated as 501 in FIGS. 5A and 6A, to the position indicated in FIG. 6A and also indicated in FIG. 6 in broken lines. It will be noted that knob 500, FIG. 1, has been turned to the position in which the designation H is under the indicator point 503, FIG. 6A, to indicate that a holding path bridging conductors T1 and R1 of line one has been closed. As the knob is turned clockwise from its normal position, step by step cam 301 moves such that its engaging shoulder 301B (FIG. 6) first engages bushing 101, which thereby is moved to the left to close contacts 103, completing a holding path for line one traceable from conductor T1, through the winding of relay 600, then hookswitch spring contacts 602, make contact 103, break contact 202, and then to conductor R1 of the line. The winding is energized over this path from the central battery, not shown, in the central office and relay 600 operates. Operated relay 600 closes its make contact 601, which is in parallel connection to break contact 202. As the cam 301 now further rotates, bushing 101 is moved further to the left to engage and move bushing 102 to the left, whereby bushing 102 is caused to move the transfer springs from break contacts 104, 106 to make contacts 105, 107, as shown in FIG. 6. As a third step in the sequence of operations, cam 301 moves its near-apex engaging shoulder, designated 301C, into engagement with bushing 201 and upon being fully rotated to the right, as shown dotted in FIG. 6, causes contacts 202 to open the previously traced operating path for relay 600. Relay 600 remains operated from line one over a bridging path including its locking contact 601 and close contacts 103, so that in effect relay 600 maintains a hold connection on that line, hence preventing an on-hook signal from being returned to the line. With the key so operated, relay 600 will restore only under either of two conditions, namely, either upon opening of the loop circuit at the central office end, or locally due to the opening of hookswitch spring contacts 602 at the time the handset is restored.

In another respect, when the button 500 is turned counterclockwise to its normal position and cam 301 becomes disengaged with bushings 101 and 201 of the spring pileups, as shown in FIG. 5, the station circuit is retransferred from line two to line one and operated relay 600 also restores upon opening of the control contact 103 included in both the operating circuit and bridging path connected to the line one conductors. Thus the hold condition on line one is again from the station circuit in lieu of the relay path connection.

If instead cam 301 is turned in the opposite direction, counterclockwise as indicated by designation 502 of FIG. 5A, shoulder 301A of the cam will engage bushing 201 first, causing break contact 202 to open before the cam advanced to a position where its apex shoulder 301D engages and moves buffer 101 to operate the first pileup of contact springs. Thus the second pileup is operated first and the first pileup second and hence contact 202 is opened before contact 103 closes, so that the operating circuit for the winding of relay 600 remains open at all times while the station circuit is being transferred from the first line to the second line. If the operated key button is now turned in a clockwise direction to its normal position shown in FIG. 5, disengagements of the cam surfaces with the spring pileups are in a reverse order such that the first pileup restores first and the second pileup second, with open contact 103 assuring an incomplete path to the winding of relay 600 during this movement of the cam shaft.

From what has been said above, it will be understood that this invention simplifies the design and operation of two-line telephone stations, because holding of the line is dependent upon the sense of actuation of only a single switching device. It will also be understood that the button arranged for rotational movements of this key type switching device can also be depressed for independently controlling signal paths including apparatus such as buzzers, and ringers, over connections through the auxiliary set of make contact springs.

It will be evident from the above description that the features described could be provided by devices other than a manual key, such as for example, a polarized relay with an armature cam arrangement for operating the spring pileups by movement in one or the other direction.

Having fully described the features and aspects of our invention, what we consider to be new will be pointed out in the appended claims.

What is claimed is:

1. In a communication system, a first line and a second line, a station circuit, a switching device having contacts for causing connections of said station circuit to be transferred from said first to said second line, a line holding relay having an operating circuit and a locking circuit, said switching device also having a first control contact for enabling said operating circuit, a second control contact for disabling said operating circuit, and an actuating element for sequentially actuating said contacts, said element being designed for selective operation in two opposite directions such that said transfer contacts are operated upon operation of said element in either direction, said first control contact is operated first and said second control contact second if said element is operated in one direction, and said second control contact is operated first and said first cntrol contact second if said element is operated in the opposite direction, whereby said holding relay is permitted to operate and lock only if said element is actuated in said first-mentioned direction.

2. The combination in a communication system as claimed in claim 1, wherein said holding relay comprises a winding and a locking contact; and wherein said relay both operates from said winding being energized via said first line over a path serially including said first and second control contacts, being a make contact and a break contact respectively, and remains operated with said winding being held energized via said line in a line-bridging path serially including said first contact and said locking contact, for holding said line upon transfer of said station circuit to said second line in response to movement of said element in said one direction.

3. The combination in a communication system as claimed in claim 2, wherein said second control contact in said operating circuit path is momentarily bridged by said locking contact until said second control contact opens subsequent to said transfer of the station circuit from said first to said second line.

4. The combination in a communication system as claimed in claim 2, wherein said holding relay operating circuit is disabled by said break contact operating first and remaining operated while said transfer is effected upon movement of said element in said opposite direction thereby preventing said relay from operating and completing said bridging path to hold said first line.

5. The combination in a communication system as claimed in claim 4, wherein said element of the switching device comprises a manually controlled member having cam means for sequentially operating said contacts such that said first line is held over said bridging path only if said member is moved in said first of two directions to transfer said station circuit to said second line.

6. A switching device having a rotatably mounted actuating cam including first and second coplanar arcuately-shaped cam surfaces of different length formed symmetrically with respect to each other on diametrically opposed ends of said cam, a first and a second contact spring pileup mounted generally opposite to each other on said device for independent and sequential engagement by said coplanar arcuately shaped cam surfaces, respectively, so that upon rotation of said cam in one direction said first surface operates said first spring pileup first and said second surface operates said second spring pileup second and upon rotation of said cam in the opposite direction said first surface operates said second spring pileup first and said second surface operates said first spring pileup second.

References Cited

UNITED STATES PATENTS

| | | | |
|---|---|---|---|
| 3,206,563 | 9/1965 | Locke et al. | 200—6 |
| 2,936,341 | 5/1960 | Greshel et al. | 179—99 |

FOREIGN PATENTS

| | | |
|---|---|---|
| 229,756 | 3/1925 | Great Britain. |

KATHLEEN H. CLAFFY, *Primary Examiner.*

A. H. GESS, *Assistant Examiner.*

U.S. Cl. X.R.

200—1, 6